United States Patent [19]

Sonntag et al.

[11] Patent Number: 5,780,981
[45] Date of Patent: Jul. 14, 1998

[54] PROCESS FOR DYNAMICALLY ADJUSTING THE POWER FOR A VEHICLE HAVING A FUEL CELL

[75] Inventors: Josef Sonntag, Illertissen; Helmut Lorenz, Unterensingen, both of Germany

[73] Assignee: Daimler-Benz AG, Germany

[21] Appl. No.: 741,764

[22] Filed: Nov. 4, 1996

[30] Foreign Application Priority Data

Nov. 2, 1995 [DE] Germany .................. 195 40 824.1

[51] Int. Cl.$^6$ ........................................ B60L 11/18
[52] U.S. Cl. ................................. 318/139; 429/23
[58] Field of Search ................... 318/139; 429/12, 429/13, 22, 23; 180/65.1, 65.2, 65.3

[56] References Cited

U.S. PATENT DOCUMENTS

| | | |
|---|---|---|
| 4,081,693 | 3/1978 | Stone . |
| 5,106,035 | 4/1992 | Langford, III . |
| 5,148,883 | 9/1992 | Tanaka et al. . |
| 5,631,532 | 5/1997 | Azuma et al. .................. 320/5 |
| 5,645,950 | 7/1997 | Benz et al. .................. 429/13 |
| 5,646,852 | 7/1997 | Lorenz et al. .................. 364/431.051 |

FOREIGN PATENT DOCUMENTS

| | | |
|---|---|---|
| 43 22 765 | 6/1994 | Germany . |
| 3276573 | 3/1990 | Japan . |

*Primary Examiner*—Bentsu Ro
*Attorney, Agent, or Firm*—Evenson, McKeown, Edwards & Lenahan, P.L.L.C.

[57] ABSTRACT

The invention provides a process for dynamically adjusting the power of an electric driving unit of a vehicle which is supplied with electric energy by a fuel cell, the power of the fuel cell or the provided fuel cell current being controlled by means of the supplied air volume flow. The air volume flow is adjusted by the rotational speed of a compressor, a desired rotational speed value being predetermined for the compressor based on an accelerator pedal demand. Simultaneously, based on the measured air flow volume, the actually available fuel cell current is determined and therefrom a corrected accelerator pedal demand is determined. During the starting operation, the accelerator pedal demand is supplied directly to the driving unit, whereas, at higher rotational speeds, it is limited by the corrected accelerator pedal demand.

9 Claims, 3 Drawing Sheets

5,780,981

PROCESS FOR DYNAMICALLY ADJUSTING THE POWER FOR A VEHICLE HAVING A FUEL CELL

BACKGROUND AND SUMMARY OF THE INVENTION

This invention relates to a process for dynamically adjusting the power of an electric driving unit of a vehicle having a fuel cell.

German patent document DE 43 22 765 C1 discloses a process for dynamically controlling the power of an electric driving unit in a vehicle which is supplied with electric energy by a fuel cell. Based on a power demand determined from the accelerator pedal position, the mass air flow is necessary for the fuel cell to provide the desired power is calculated and adjusted by regulating the rotational speed of a compressor arranged in the air intake pipe. In order to prevent the fuel cell from producing more electric power than the driving unit can consume, the driving unit can limit the power demand, by emitting corresponding fault reports. On the other hand, the desired power value which is supplied to the driving unit is corrected so that no more than the instantaneous power generated by the fuel cell is demanded by the driving unit. As a result, a break-down of the fuel cell voltage can be prevented.

On the one hand, this dynamic power regulating apparatus still exhibits dead times during the acceleration of the vehicle, while on the other hand, during the start, the maximum drive torque is not released. Finally, this system does not ensure that the optimal air flow to the fuel cell as a function of the demanded driving power is supplied in all operating and load ranges. Accordingly, the system becomes destabilized in the upper load range and the driving current begins to oscillate with the air supply, or, in the partial load range, an excessive air supply dries out the membrane electrode arrangement to an undesirable degree.

It is therefore an object of the present invention to provide a process for dynamically adjusting the vehicle power which achieves optimal utilization of the driving torque of the vehicle drive during the start. Another object is to provide a process which maintains the ratio of fed air to consumed air in a given range as a function of the current to be supplied.

Since a driving system powered by fuel cells is a non-linear multivariable control system, relatively high mathematical expenditures would be required for a non-linear uncoupling design which achieves a more precise control of the air supply of the fuel cell as a function of the driving power. Therefore, in order to provide a dynamic power control which ensures a maximum utilization of the driving torque during the start, according to the invention, the non-linear relationships of the fuel cell and the driving motor were determined experimentally and stored in a control unit as non-linear characteristic diagrams. In the lower rotational speed range, the accelerator pedal position is used directly for determination of the desired torque, thereby ensuring a maximal utilization of the driving torque during starting operation. By changing over to a limitation of the accelerator pedal position in the case of higher rotational speeds, an undersupply of air to the fuel cell is prevented. Moreover, by changing from a characteristic power diagram to a characteristic current diagram at low fuel cell voltages, the oscillation tendency of the system can be avoided. Finally, the generation of a desired current value directly in the driving motor converter has the advantage that, on the one hand, the need for adjustment of the characteristic current diagrams or characteristic power diagrams is eliminated. On the other hand, vehicle handling is improved in that, as a result of the front-connected air supply, an accelerator pedal limitation will no longer occur during the acceleration. Also, the number of cell voltage alarms is reduced.

Other objects, advantages and novel features of the present invention will become apparent from the following detailed description of the invention when considered in conjunction with the accompanying drawings.

DETAILED DESCRIPTION OF THE DRAWINGS

Figure 1:
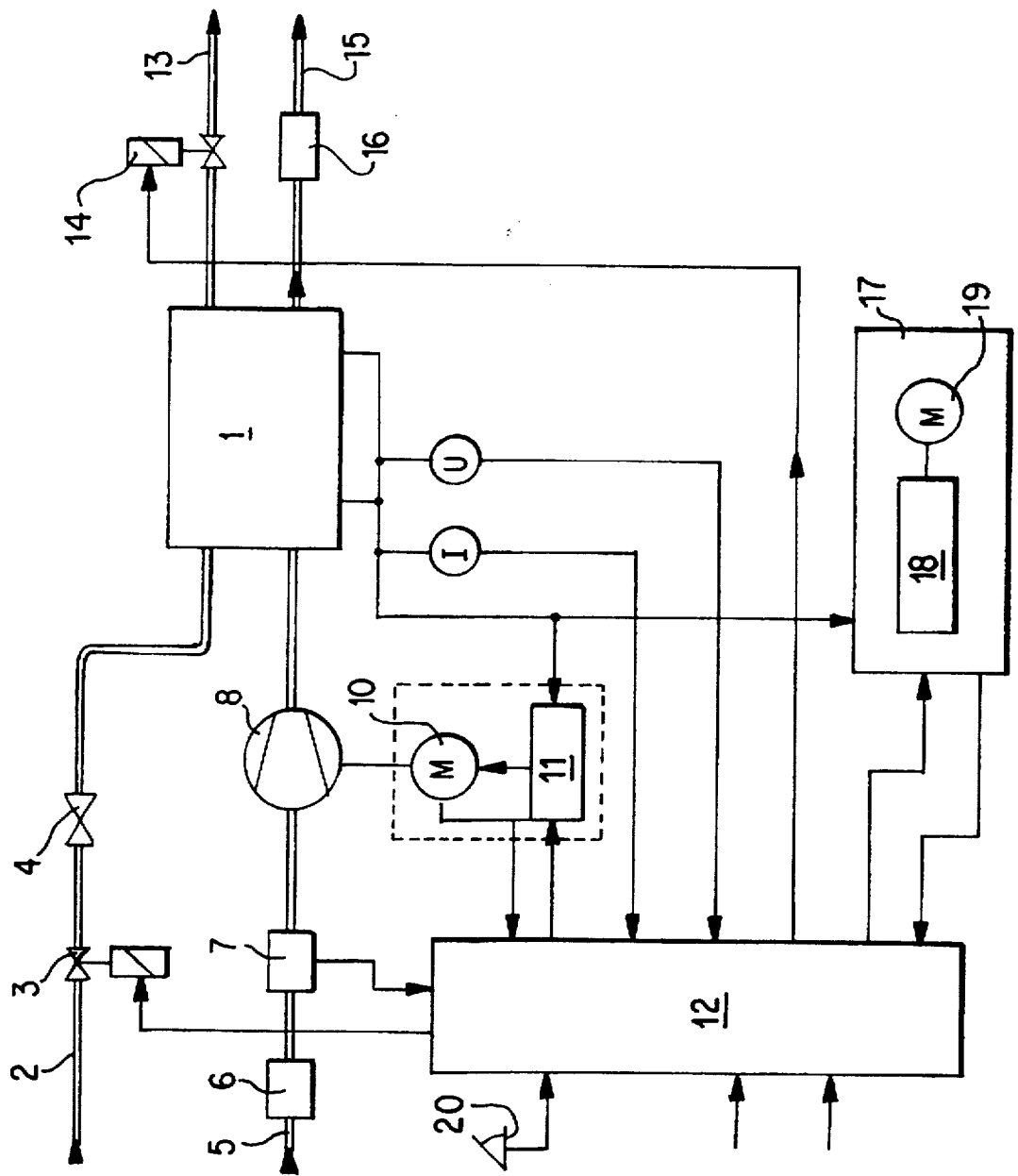
FIG. 1 is a basic diagram of a vehicle propulsion system which includes a driving motor, a fuel cell and a propulsion control system.

The fuel cell 1 in FIG. 1 may be, for example, a fuel cell with a proton-conducting membrane called a PEM cell. It is supplied with a fuel, such as hydrogen gas, by way of a first feed pipe 2 in which a valve 3 and a pressure regulator 4 are arranged. A second feed pipe 5, with an air filter 6, a mass air flow meter 7 and a compressor 8, supplies a pressurized oxidant, preferably oxygen or ambient air, to the fuel cell 1. In the fuel cell 1, the fuel is oxidized on the anode, while the oxidant is reduced on the cathode. (To avoid an oxyhydrogen gas reaction between the hydrogen and the oxygen, the anode and the cathode are separated from one another by the proton-conducting membrane.) During this electrochemical reaction, a voltage is generated between the two electrodes, and by means of the parallel or series connection of many such cells to form a so-called stack, voltages and current intensities can be achieved which are sufficient for driving a vehicle.

An electric motor 10, which drives the compressor 8, is supplied with electric energy by the fuel cell 1 in normal operation. A compressor converter 11, which is controlled by a control unit 12, regulates the rotational speed $n_K$ of the electric motor (and therefore that of the compressor 8 as well). By way of the rotational speed $n_K$ of the compressor 8, the oxidant mass flow $m_{L-act}$ and therefore the power $P_{BZ}$ of the fuel cell 1 can be influenced.

The discharge of gas from the fuel cell 1 takes place by way of a first discharge pipe 15. A pressure regulating valve 16 arranged in the discharge pipe 15 maintains a variable air operating pressure in the fuel cell 1. To remove possible deposits or contaminations of the hydrogen gas from the fuel cell 1, a second discharge pipe 13, is provided which has a so-called purge valve 14. To drive the vehicle, a driving unit 17 is provided which consists of a driving motor converter 18 and an electric driving motor 19.

By way of electric lines, the control unit 12 receives information, among other things, on the actual instantaneous value of the air flow $V_{L-act}$, the operating condition of the driving unit 17, the rotational speed $n_{FM}$ of the electric driving motor 10, and the demand FP on the accelerator pedal 20, as well as the voltage $U_{BZ}$ generated by the fuel cell 1 and the corresponding current $I_{BZ}$. This information is processed in one or several control units 12, which generate, among other things, actuating signals for the converters 11 and 18 and the valves 3 and 14 which signals, in turn, are transmitted by corresponding lines to the individual components.

Figure 2:
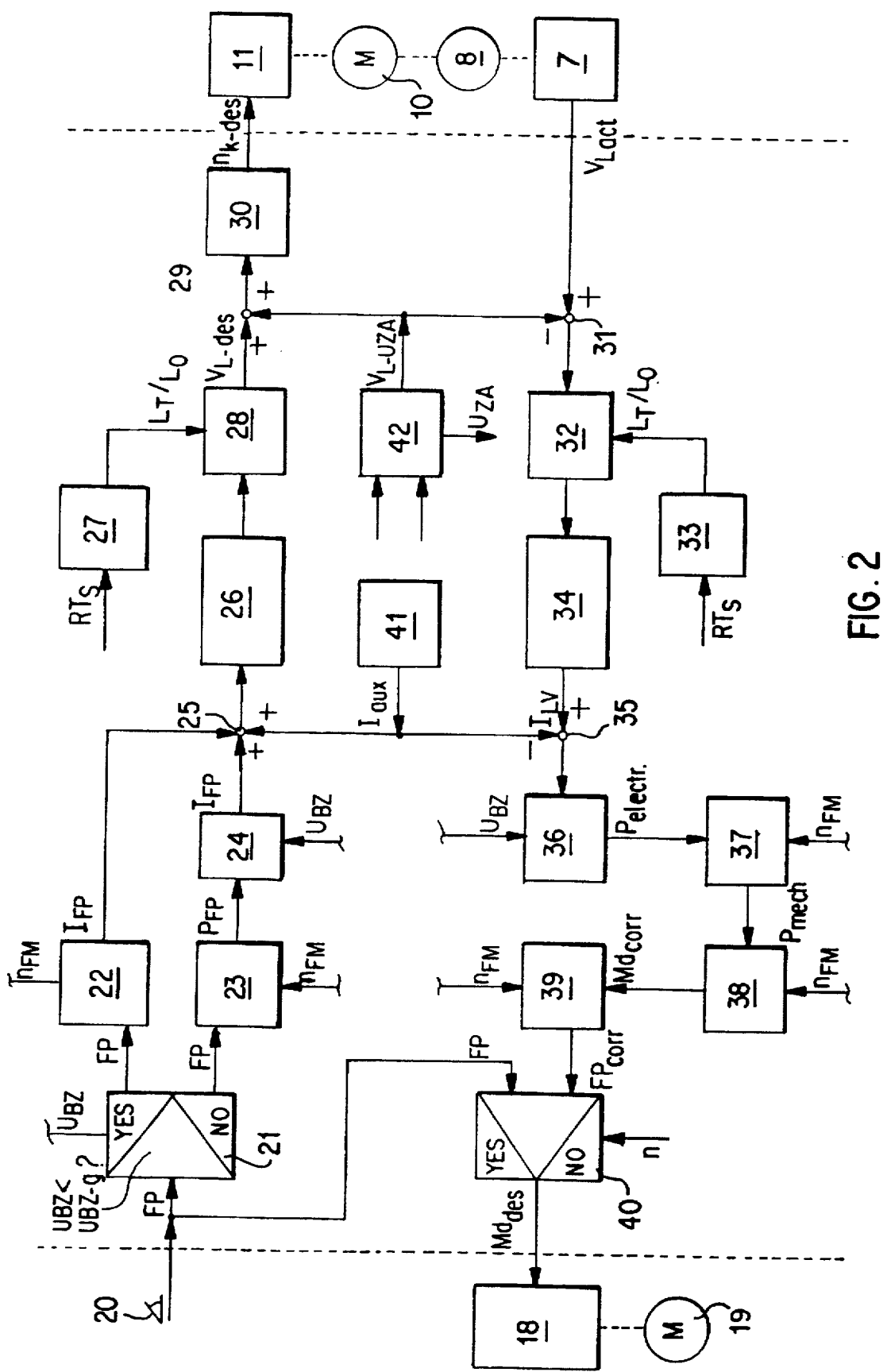
FIG. 2 is a basic diagram of a process for the power control of a vehicle having a fuel cell.

The system according to FIG. 2 is divided by vertical broken lines into three areas. The left area comprises the driving unit 17, and consists of an accelerator pedal 20 and the electric driving motor 19 with the pertaining driving motor converter 18. The right area comprises the air supply of the fuel cell 1 which includes the compressor converter 11, the electric motor 10, and a compressor 8. There is also a sensor 7 for measuring the supplied air volume flow $V_{L-acr}$. For this purpose, a hot-wire mass air flow meter, in the following called HLM sensor, is preferably used. The center part of FIG. 2 comprises the control of the system, which can be contained in one or several control modules 12.

As shown in FIG. 2, the accelerator demand FP from the accelerator pedal 20 is read directly into block 40 as an input quantity. In blocks 21 to 30, the air supply $V_{L-des}$ (and thus the power $P_{BZ}$ of the fuel cell 1) is controlled on the basis of the accelerator demand FP. On the other hand, in the blocks 31 to 39, a corrected desired value $FP_{corr}$ for the accelerator pedal demand is determined from the measured actual air flow volume $V_{L-acr}$ and is also read into block 40. There, based on the instantaneous rotational speed $n_{FM}$ of the driving motor, a desired torque $Md_{des}$ is determined from either the actual accelerator pedal demand FP or the corrected demand $FP_{corr}$, and is emitted to the driving unit 17. Specifically, up to a rotational limit speed $n_{FM-g}$ (for example, 1,500 r.p.m.), the desired torque $Md_{des}$ is determined directly from the FP. At rotational speeds $n_{FM}$ above the rotational limit speed $n_{FM-g}$, the lower of the two values FP or $FP_{corr}$ is used to determine the desired torque $Md_{des}$.

This approach has the advantage that, at low rotational speeds $n_{FM}$, which are less than the limit speed $n_{FM-g}$ (that is, mainly during the starting operation), the full torque of the driving unit 17 is available without any delay. In order to avoid an undersupply of air to the fuel cell 1, however, the value for the driving pedal demand FP is limited at higher speeds $n_{FM} > n_{FM-g}$ by the corrected accelerator pedal demand $FP_{corr}$.

The air supply to the fuel cell 1 is controlled in the blocks 21 to 30. A desired current value $I_{FP}$ is first determined in blocks 22 to 24 from the measured accelerator pedal demand FP, based on the instantaneous rotational speed $n_{FM}$ of the electric driving motor 19. This takes place either in block 22, by means of a characteristic current diagram, or in blocks 23 and 24 by means of a characteristic power diagram (block 23) and a subsequent division by the measured fuel cell voltage $U_{BZ}$ (block 24). Since the system tends to oscillate at low fuel cell voltages $U_{BZ}$, due to this division in block 24, the suitable branch (block 22 or blocks 23 and 24) is selected in block 21, based on whether the measured fuel cell voltage $U_{BZ}$ is less than a given limit voltage $U_{BZ-g}$ (for example, $U_{BZ-g}$=153 V). That is, the characteristic current diagram is used for values of $U_{BZ}$ below $U_{BZ-g}$ and, above the limit voltage $U_{BZ-g}$, the characteristic power diagram is used.

Subsequently, in block 26, a desired value for the air volume flow $V_{L-des}$ is determined from the desired current value $I_{FP}$ by means of a characteristic curve which represents the non-linear relationship ($V_{L-des}$=f($I_{FP}$)) between the desired values for the air volume flow $V_{L-des}$ and the desired current value $I_{FP}$. The desired air volume flow value $V_{L-des}$ is determined preferably in m³/h (standard pressure) at a nominal operating temperature $RT_{SO}$ of 72° C. In order to improve the cold-start characteristics of the fuel cell 1, this desired air volume flow value $V_{L-des}$ can be adapted in block 28 to accommodate the increased air requirement of the fuel cell 1 during the cold start by multiplication with a cold-start factor $L_T/L_O$. The cold-start factor $L_T/L_O$, which can preferably assume values of between 1 and 1.6, is determined in block 27 as a function of the actual operating temperature $RT_S < RT_{SO}$ from a characteristic curve. Subsequently, in block 30, by means of another characteristic curve, the desired air volume flow value $V_{L-des}$ is converted into a desired value $n_{K-des}$ for the compressor 8, and is provided to the air supply 11, 7, 8 of the fuel cell 1. To control the air volume flow $V_{L-acr}$, the rotational speed $n_K$ of the electric motor 10, and thus of the compressor 8, is continuously adjusted to this desired rotational speed $n_{K-des}$ by the compressor converter 11.

Since the air supply is characterized by a delay time between the desired-value indication and the actual air volume flow, in blocks 31 to 39, a corrected accelerator pedal demand $FP_{corr}$ is calculated from the measured air volume flow $V_{L-acr}$. In certain operating ranges (as discussed above), this corrected accelerator pedal demand $FP_{corr}$ will then have a limiting effect on the power consumed by the driving unit 17. As a result, the driving unit 17 can be prevented from demanding more instantaneous current or power from the fuel cell 1 than the latter can supply.

In comparison to blocks 21–30, the determination of the corrected accelerator pedal demand $FP_{corr}$ in blocks 31–39 takes place in the reverse sequence, by means of correspondingly inverted characteristic diagrams. However, the step according to block 30 is eliminated because the HLM sensor 7 directly provides the current actual air volume flow value $V_{L-acr}$ which is then reduced again in block 32 by the cold-start proportion $L_T/L_O$, so that the driving unit 17 receives only the desired value predetermined by the accelerator pedal demand. In block 34 (which corresponds to block 26), an actual current value $I_{LV}$ is determined from the actual air volume flow value $V_{L-acr}$. Thereafter, blocks 36–39, the corrected accelerator pedal demand $FP_{corr}$ is determined from the actual current value $I_{LV}$. For this purpose, the available electric power $P_{electr}$ is determined in block 36 based on the fuel cell voltage $U_{BZ}$, and by means of the instantaneous rotational driving motor speed $n_{FM}$, the resulting mechanical power $P_{mech}$ is determined in block 37. Finally, in blocks 38 and 39, in each case as a function of the momentary rotational driving motor speed $n_{FM}$, the corrected desired torque $Md_{corr}$ for the driving unit 17 is determined from the mechanical power $P_{mech}$, and the corrected accelerator pedal demand $FP_{corr}$ is determined from that.

This corrected accelerator pedal demand $FP_{corr}$ is used in addition to the accelerator pedal demand FP derived directly from the accelerator pedal 20 and to the rotational speed of the driving unit 17, as an input quantity for determination of the desired torque $Md_{des}$ for the driving unit 17 in block 40. As described previously, below a rotational limit speed $n_{FM-g}$, the desired torque $Md_{des}$ is determined from the accelerator pedal demand FP, while above this rotational limit speed $n_{FM-g}$, the desired torque $Md_{des}$ is computed on the basis of the actual or corrected accelerator pedal demand FP, $FP_{corr}$, whichever value is lower. Thus, above the rotational limit speed $n_{FM-g}$, the corrected accelerator pedal demand $FP_{corr}$ limits the desired torque $Md_{des}$. This desired torque $Md_{des}$ is transmitted to the driving unit 17, which then consumes the corresponding power from the fuel cell 1.

The process described above therefore does not represent a regulating of power, but rather a dynamic power control, in the case of which the driving power demanded by the driver via the accelerator pedal 20 is transmitted to the air supply of the fuel cell 1, on the one hand and, is transmitted directly to the driving unit 17 on the other. Under certain operating conditions (for example, during strong acceleration operations, during a cold start or in the case of disturbances at the fuel cell), the computation of the corrected accelerator pedal demand $FP_{corr}$ may have a limiting effect on the torque demand $Md_{des}$ transmitted to the driving unit 17, thus preventing a possible undersupply of air to the fuel cell 1. This means that the power demand predetermined by the driver may optionally be corrected by means of the actual power $P_{electr}$ of the fuel cell 1, calculated based on the measured air volume flow $V_{L-act}$ in order to optimally operate the driving unit 17 and the fuel cell 1. At every operating point, the fuel cell 1 is therefore operated by means of an optimal air supply: that is, the ratio $\lambda$ of the supplied air to the air consumed in the fuel cell 1 corresponds to the characteristic curve given in block 26, because the consumed air is directly proportional to the supplied current $I_{LV}$.

In the process described in the above embodiment, the electric energy consumed by electric accessories in the vehicle is also taken into account. For this purpose, the required electric auxiliary current $I_{aux}$ is determined in block 41, for example, by reading corresponding characteristic diagrams for the additional individual accessories. This auxiliary current $I_{aux}$ is added to the desired current value $I_{FP}$ in block 25, and is then subtracted from the determined actual current value $I_{LV}$ in block 35. Although the increased energy consumption is thus taken into account during the desired-value determination for the air supply to the fuel cell 1, this proportion is subtracted again for the determination of the corrected accelerator pedal demand $FP_{corr}$ for the vehicle drive.

In addition to the electric auxiliary energy, the described process also takes into account so-called cell voltage alarms. Normally, in the case of fuel cells 1, devices are provided for monitoring the cell voltage, such represented as block 42 in FIG. 2, which generate alarm signals $U_{ZA}$ in the event of disturbances of the fuel cell 1. In this case, a differentiation can also be made between several alarm conditions $U_{ZA1}$, $U_{ZA2}$. In order to avoid unacceptable operating conditions of the fuel cell 1 (for example, cell voltages which are too low), in the case of a cell voltage alarm $U_{ZA}$, the desired air volume flow $V_{L-des}$ is increased in block 29 by a given amount $V_{L-UZA}$, thereby preventing an undersupply of air to the fuel cell. In order nevertheless to be able to compute, from the measured actual air volume flow value $V_{L-act}$ a corrected accelerator pedal demand FP corresponding to the accelerator pedal position, this additional air volume flow $V_{L-UZA}$ is subtracted again in block 31 from the actually measured actual air volume flow value $V_{L-act}$.

The non-linear relationships between the fuel cell and the driving motor used in the process can, for example, be determined experimentally, and can be stored as non-linear characteristic diagrams in one or several control units.

Figure 3:
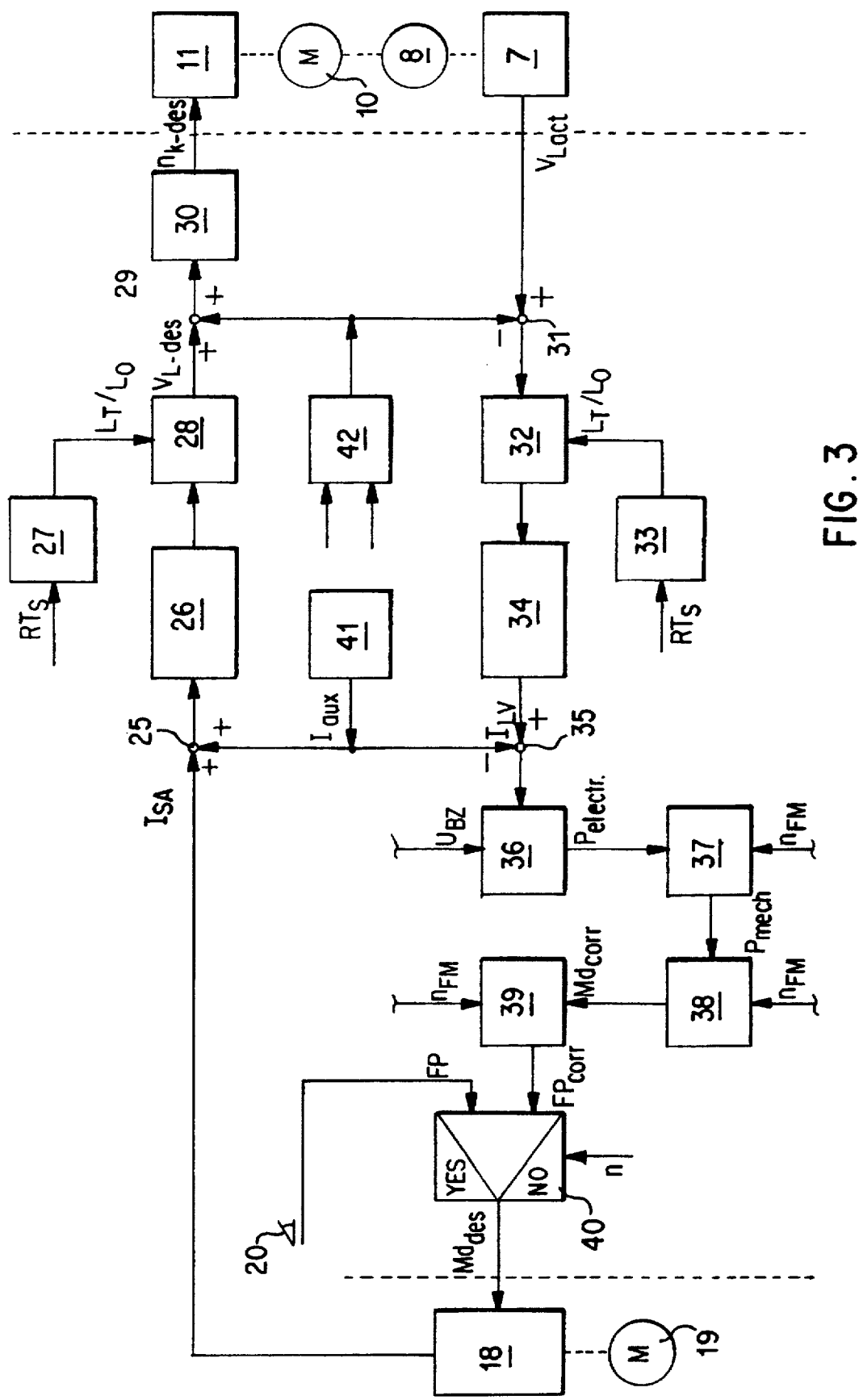
FIG. 3 is a view of another embodiment of a process according to the invention.

A second embodiment of the invention is illustrated in FIG. 3, in which identical parts are marked by identical reference symbols. In the process described above, the air supply of the fuel cell 1 followed the respective existing rotational speed $n_{FM}$ of the electric driving motor 19, and thus the momentary actual current value of the driving unit 17, by way of the characteristic diagrams 22 and 23. In order now to control the air supply to the fuel cell 1 in advance of the corresponding power or current consumption of the driving unit 17 (and therefore, if possible, to avoid limitation of the accelerator pedal demand FP during the acceleration), in this second embodiment, the desired current value $I_{FP}$ is generated by an additional device in the driving motor converter 18, as described in more detail hereinafter.

Drive regulating for electric rotary-current motors are known from prior art, for example, from the journal *Elektronik*, Volume 21/1994, Pages 58, an on. However, the invention can be applied to all known electric motors, and to the corresponding drive regulating.

This process has the advantage that characteristic diagrams 22 and 23, together with the corresponding adjustment, are eliminated. Based on the accelerator pedal demand FP, a new desired current value $I_{FP}$ is supplied to the control unit 12 approximately every 70 µs, and from it the corresponding desired rotational speed $n_{K-des}$ is determined for the electric motor 10. The respective desired values are therefore provided to the electric driving unit 17 and to the air supply virtually simultaneously with the actual demand. A limitation $FP_{corr}$ of the accelerator pedal demand during the acceleration will no longer occur as a result of this front-connected air supply. In addition, fewer cell voltage alarms $U_{ZA}$ should be expected, which improves the vehicle handling as a whole.

In contrast to the first embodiment, in the case of the process according to FIG. 3, the blocks 21 to 24 are eliminated, and desired values are determined for the motor line currents of the electric driving motor based on the torque demand $Md_{des}$ in the driving motor converter 18 transmitted to the driving unit 17. A desired current value $I_{FP}$ is then generated, based on the desired motor line current values thus determined, as a function of the driving motor or fuel cell voltage $U_{BZ}$, the power adjuster temperature and its efficiency, and the value thus determined is transmitted to the block 25. Thereafter, analogously to the process according to FIG. 1, in blocks 26 to 30, a desired value for the rotational compressor speed $n_{K-des}$ is determined from this desired current value $I_{FP}$ and is adjusted correspondingly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for controlling power generated by a driving unit of an electric vehicle which is supplied with electric energy by a fuel cell, said process comprising the steps of:
   determining a desired value for fuel cell power based on an actual accelerator pedal demand value;
   continuously controlling power of said fuel cell based on said actual accelerator pedal demand value;
   measuring actual fuel cell power;
   determining a corrected accelerator pedal demand value based on said actual fuel cell power, which corrected accelerator pedal demand value corresponds to maximum fuel cell power provided for the driving unit;
   measuring rotational speed of said driving unit;
   when said rotational speed of the driving unit is below a predetermined threshold value, adjusting power consumption of the driving unit based on said actual accelerator pedal demand value; and
   when said rotational speed exceeds said predetermined threshold value, adjusting power consumption of the driving unit based on whichever is lower of the corrected accelerator pedal demand value and the actual accelerator pedal demand value.

2. Process according to claim 1 wherein said step of determining a desired value for fuel cell power comprises the steps of:
   reading an actual fuel cell voltage of said fuel cell;
   when said actual fuel cell voltage is less than a predetermined limit value, determining a desired current value for said fuel cell by means of a characteristic current diagram for the driving unit, based on said rotational speed of said driving unit and on said actual accelerator pedal demand value; and when said actual fuel cell voltage exceeds said predetermined limit value, determining a desired power value for said fuel cell by means of a characteristic power diagram for the driving unit based on said rotational speed of said driving unit and on said actual accelerator pedal demand, and thereafter determining said desired current value for said fuel cell based on said desired power value and on an instantaneous value of said actual fuel cell voltage.

3. Process according to claim 1, comprising the further step of compensating for a required current demand of the additional electric accessories, by increasing a desired current value by a predetermined amount and decreasing a measured actual current value by a corresponding amount.

4. Process according to claim 1, comprising the further step of compensating for an increased air requirement of the fuel cell during a cold start by means of a cold-start factor which is predetermined as a function of the actual operating temperature.

5. Process according to claim 1, comprising the further step of, when a cell voltage alarm is present, a desired air volume flow value is increased by a predetermined amount and a measured actual air volume flow value is reduced by the corresponding amount.

6. Process according to claim 1, wherein determining the corrected accelerator pedal demand value, efficiency of the driving unit is taken into account.

7. Process according to claim 1, wherein at least non-linear relationships of the fuel cell and of the driving unit are determined in experiments and are stored as non-linear characteristic diagrams.

8. Process according to claim 1, comprising the further steps of measuring actual air volume value flowing to said fuel cell, and modifying the actual accelerator pedal demand value based thereon.

9. Process according to claim 1, wherein air supply to the fuel cell is maintained within a predetermined $\lambda$-range as a function of the fuel cell current.

* * * * *